United States Patent
Bernhardt et al.

(10) Patent No.: US 10,140,856 B2
(45) Date of Patent: Nov. 27, 2018

(54) AUTOMATIC DETECTION OF LANE CLOSURES USING PROBE DATA

(71) Applicant: HERE GLOBAL B.V., Eindhoven (NL)

(72) Inventors: Bruce Bernhardt, Chicago, IL (US); James Fowe, Chicago, IL (US); Filippo Pellolio, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 63 days.

(21) Appl. No.: 15/370,311

(22) Filed: Dec. 6, 2016

(65) Prior Publication Data
US 2018/0158325 A1  Jun. 7, 2018

(51) Int. Cl.
*G08G 1/01* (2006.01)
*G01C 21/30* (2006.01)
*G08G 1/0967* (2006.01)

(52) U.S. Cl.
CPC .......... *G08G 1/0133* (2013.01); *G01C 21/30* (2013.01); *G08G 1/0112* (2013.01); *G08G 1/0129* (2013.01); *G08G 1/0141* (2013.01); *G08G 1/0967* (2013.01)

(58) Field of Classification Search
CPC .. G08G 1/0133; G08G 1/0967; G08G 1/0125; G08G 1/0104; G08G 1/0129
See application file for complete search history.

(56) References Cited

U.S. PATENT DOCUMENTS

| | | | | |
|---|---|---|---|---|
| 6,385,539 B1* | 5/2002 | Wilson | ................... | G01C 21/30 340/905 |
| 9,240,123 B2 | 1/2016 | Stenneth | | |
| 9,361,797 B1 | 6/2016 | Chen et al. | | |
| 9,721,471 B2* | 8/2017 | Chen | ................... | G08G 1/167 |
| 9,903,733 B2* | 2/2018 | Bai | ................... | G01C 21/36 |

(Continued)

FOREIGN PATENT DOCUMENTS

DE  102015000394 A1  7/2016

OTHER PUBLICATIONS

Asakura, Yasuo, et al., "Incident Detection Methods Using Probe Vehicles with On-Board GPS Equipment", *Transportation Research Procedia*, 2015, pp. 17-27, Elsevier, B.V., Netherlands.

(Continued)

*Primary Examiner* — Nicholas Kiswanto
(74) *Attorney, Agent, or Firm* — Alston & Bird LLP

(57) ABSTRACT

A plurality of instances of probe data are received. Each instance is received from a probe apparatus of a plurality of probe apparatuses each comprising a plurality of sensors and being onboard a vehicle. An instance comprises location information indicating a location of the corresponding probe apparatus. For each of one or more instances, a distance parameter is determined based on the location information and a road segment corresponding to the location. A set of distance parameters is defined based on the distance parameter determined for each of the one or more instances. The set of distance parameters is analyzed to identify clusters of probe data. The number of clusters identified is determined and compared to a historical number of clusters. If the number of clusters identified is less than the historical number of clusters, it is determined that there is a lane closure corresponding to the road segment.

20 Claims, 8 Drawing Sheets

(56) References Cited

U.S. PATENT DOCUMENTS

| | | | |
|---|---|---|---|
| 2011/0043377 A1 | 2/2011 | McGrath et al. | |
| 2013/0282264 A1* | 10/2013 | Bastiaensen | G01C 21/3492 |
| | | | 701/119 |
| 2014/0358414 A1* | 12/2014 | Ibrahim | G01C 21/10 |
| | | | 701/118 |
| 2015/0170514 A1 | 6/2015 | Stenneth | |
| 2016/0091609 A1 | 3/2016 | Ismail et al. | |
| 2016/0167582 A1 | 6/2016 | Chen et al. | |
| 2016/0171893 A1* | 6/2016 | Chen | G08G 1/167 |
| | | | 701/300 |
| 2017/0278388 A1* | 9/2017 | Bansal | G08G 1/0145 |
| 2017/0286782 A1* | 10/2017 | Pillai | B60W 40/08 |
| 2017/0316684 A1* | 11/2017 | Jammoussi | G06T 11/60 |

OTHER PUBLICATIONS

Rogers, Seth, et al., "Learning to Predict Lane Occupancy Using GPS and Digital Maps", *Proceedings of the Fifth International Conference on Knowledge Discovery and Data Mining*, 1999, 27 pages, San Diego, CA, ACM Press.

European Patent Office, Extended European Search Report for Application No. 17205545.1, dated May 16, 2018, 9 pages, Germany.

Schroedl, Stefan, et al., "Mining GPS Traces for Map Refinement", *Data Mining and Knowledge Discovery*, Jul. 2004, pp. 59-87, vol. 9, Kluwer Academic Publishers, The Netherlands.

* cited by examiner

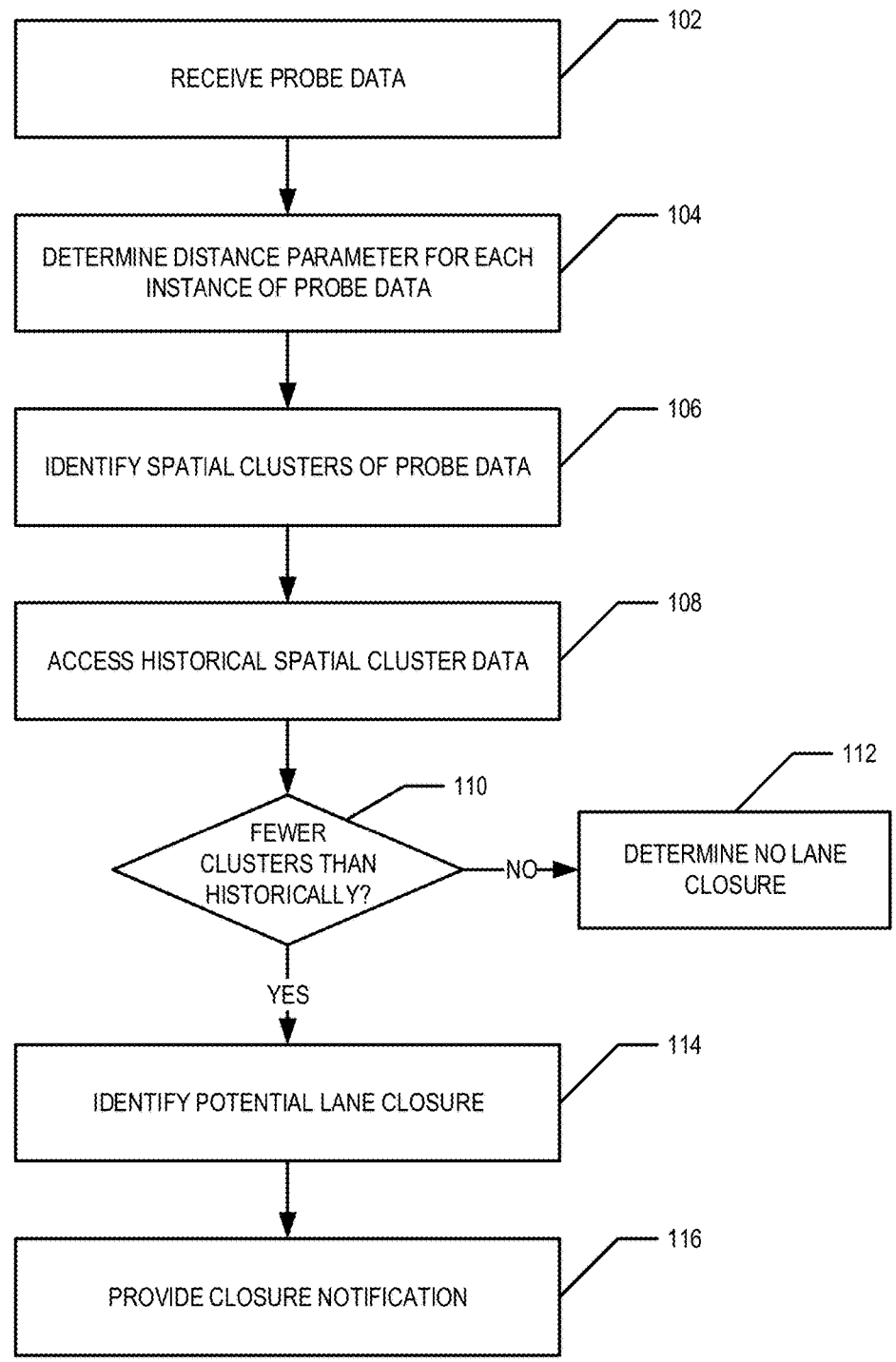

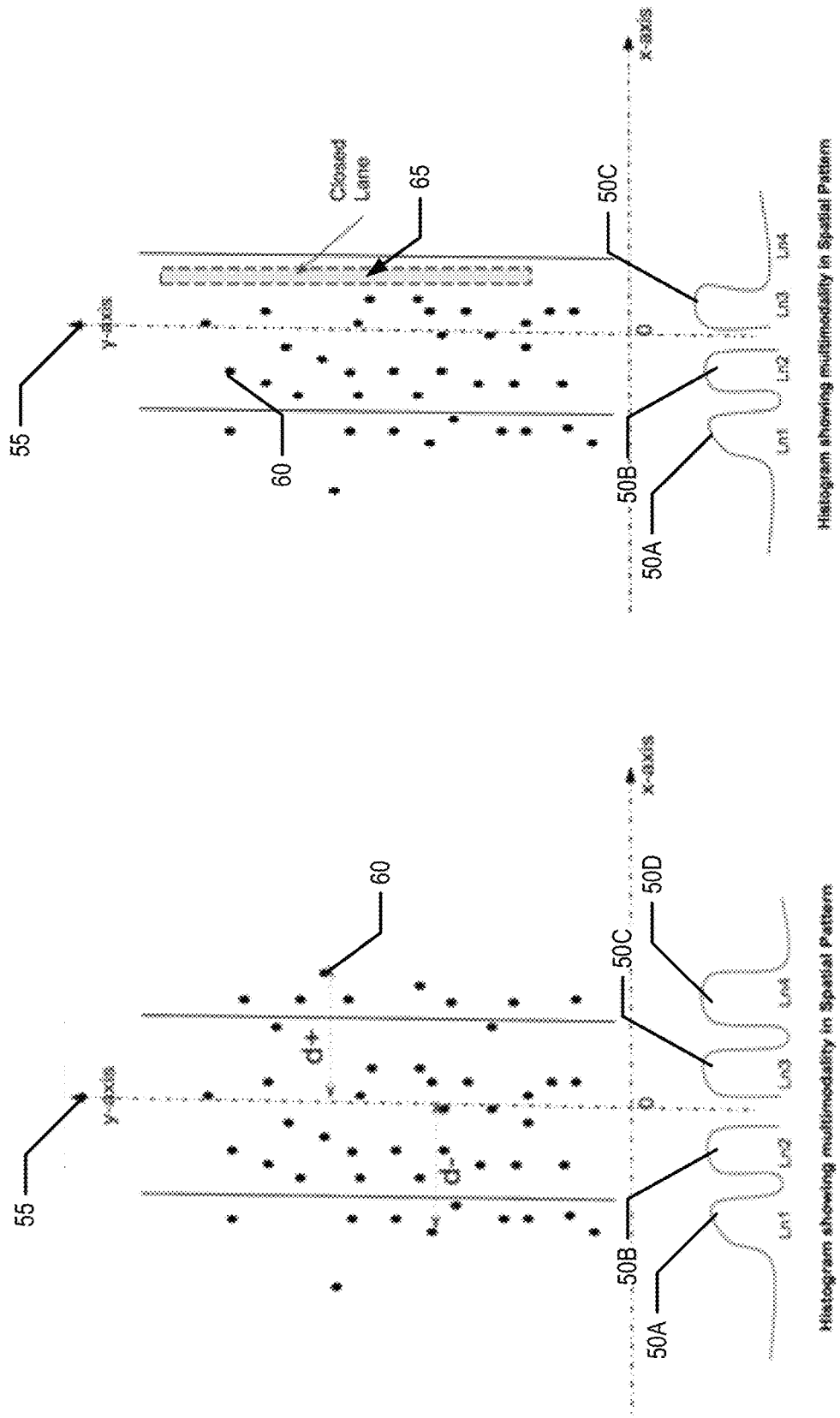

FIG. 6

```
V ← {a list of each probed value}
function MDC(V):
  ⎧ s ← STD(V)
306 ⎨ m ← mean(V)
  ⎩ V ← V ∧ V < m + 2s & V > m − 2s   // first outlier filtering ⎧ r ← Range(V) / 16
  ⎪ Max ← max(V)
308⎨ for i ← 1 to 16     // bucketizing
  ⎪   $b_i$ ← {V ∧ V <= [Max − (i−1)*r] & [V > (Max − i*r)]}
  ⎪   V ← V − $b_i$
  ⎩ end for V ← $b_1$ + $b_2$ + ... + $b_{16}$        // restore V
310  C ← 1
  ⎧ for i ← 2 to 16     // cluster search
  ⎪   MG ← (mean($b_1$) − mean($b_i$)) / Range(V)
  ⎪   if |$b_i$| > P1 and MG > P2 and |V − $b_i$| > P3  // P1, P2, P3 are tuning parameters
314⎨   then {
  ⎪       MD ← {C, mean($b_1$), size($b_1$), STD($b_1$), MG}
  ⎪       C ← C + 1
  ⎪       V ← V − $b_i$
  ⎪       $b_1$ ← $b_i$
  ⎩     }
312  else $b_1$ ← $b_1$ + $b_i$
     endif
     end for
316  MD ← {C, mean($b_1$), size($b_1$), STD($b_1$)}
     return MD
     end MDC
```

AUTOMATIC DETECTION OF LANE CLOSURES USING PROBE DATA

TECHNOLOGICAL FIELD

An example embodiment relates generally to detection of lane closures. In particular, an example embodiment generally relates to automatically detecting a lane closure on, for example, a multi-lane road using only probe data.

BACKGROUND

Generally, the location of a probe vehicle may be determined using a global navigation satellite system (GNSS), an example of which is the United States' global positioning system (GPS). Other examples of GNSS systems are GLONASS (Russia), Galileo (European Union) and Beidou/Compass (China), all systems having varying degrees of accuracy. Under good conditions, GPS provides a real-time location of a probe vehicle with a 95% confidence interval of 7.8 meters, according to the US government. Given that the width of many lanes is only 3 to 4 meters, this accuracy is not sufficient to determine the particular lane of a road segment in which a probe vehicle is traveling. As a result, determining lane level traffic information/data, such as lane closures, is difficult.

BRIEF SUMMARY OF EXAMPLE EMBODIMENTS

At least some example embodiments are directed to identifying one or more lane closures corresponding to a road segment. In an example embodiment, probe information/data may be received and a distance parameter corresponding to location information/data of the probe information/data may be determined. A set of distance parameters corresponding to a plurality of instances of probe information/data received within a configurable time period may then be analyzed to determine a number of clusters along at least a portion of the road segment. Each cluster may correspond to probe apparatuses and/or vehicles travelling along a lane of traffic of the road segment. The number of clusters identified and/or detected by analyzing the set of distance parameters may be compared to a historical number of clusters for the road segment. If the current number of clusters identified satisfies a threshold based upon a historical number of clusters, it may be determined that probe apparatuses and/or vehicles are not currently traveling along a traffic lane of the road segment corresponding to the missing cluster(s). In particular, if fewer clusters are identified and/or determined than the historical number of clusters, one or more lanes of the road segment may be closed.

In an example embodiment, a plurality of instances of probe data are received. Each instance of probe data is received from a probe apparatus of a plurality of probe apparatuses. The probe apparatus comprises a plurality of sensors and is onboard a vehicle. An instance of the plurality of instances of probe data comprises location information indicating a location of the corresponding probe apparatus. For each of one or more instances of the plurality of instances of probe data, a distance parameter is determined based on the location information and a road segment corresponding to the location. A set of distance parameters is defined based on the distance parameter determined for each of the one or more instances of the plurality of instance of probe data. The set of distance parameters is analyzed to identify clusters of probe data. The number of clusters identified is determined. The number of clusters identified is compared to a historical number of clusters. Responsive to determining that the number of clusters identified satisfies a threshold based upon the historical number of clusters, it is determined that there is a lane closure corresponding to the road segment.

In accordance with an example embodiment, a method is provided that comprises receiving a plurality of instances of probe data. Each instance of probe data is provided by and/or received from a probe apparatus of a plurality of probe apparatuses. The probe apparatus comprises a plurality of sensors and is onboard a vehicle. An instance of the plurality of instances of probe data comprises location information indicating a location of the corresponding probe apparatus. The method may further comprise, for each of one or more instances of the plurality of instances of probe data, determining a distance parameter based on the location information and a road segment corresponding to the location. The method may further comprise defining a set of distance parameters based on the distance parameter determined for each of the one or more instances of the plurality of instances of probe data; analyzing the set of distance parameters to identify clusters of probe data; determining the number of clusters identified; and comparing the number of clusters identified to a historical number of clusters. The method may further comprise, responsive to determining that the number of clusters identified satisfies a threshold based upon the historical number of clusters, determining there is a lane closure corresponding to the road segment.

In an example embodiment, the location information is determined by a global navigation satellite system (GNSS) sensor onboard the vehicle. In an example embodiment, the distance parameter is determined by identifying a position on a link of a digital map corresponding to the road segment based on the location information; determining a distance between the position and the location; and assigning the distance parameter the value of the determined distance. In an example embodiment, the position is located on a reference line corresponding to the road segment and the distance is equal to the length of a line extending from the position to the location, wherein the line is perpendicular to the reference line. In an example embodiment, the reference line corresponds to the middle of the road segment.

In an example embodiment, the plurality of instances of probe data are received within a configurable time period and the global navigation satellite system (GNSS) satellite coverage of the road segment is approximately constant over the configurable time period. In an example embodiment, the configurable time period is within the range of one minute to eighty minutes. In an example embodiment, the configurable time period is within the range of five minutes to thirty minutes. In an example embodiment, in response to determining that a lane closure event is occurring, the method further comprises providing a closure notification to a computing entity, wherein, when the closure notification is processed by the computing entity, the closure notification causes the computing entity to (a) perform one or more route calculations, (b) provide a closure alert, or (c) both.

In an example embodiment, analyzing the set of distance parameters to identify clusters of probe data comprises generating a one dimensional array from the set of distance parameters; converting the one dimensional array to a positive array; segmenting the elements of the positive array into a set of buckets; determining if pairs of adjacent buckets of the set of buckets are spatially distinct; responsive to determining that a pair of adjacent buckets are not spatially distinct, combining the pair of adjacent buckets into one bucket; and responsive to determining that a pair of adjacent buckets are spatially distinct, defining a cluster based on at least one of the buckets of the pair of adjacent buckets.

In accordance with an example embodiment, an apparatus is provided that comprises at least one processor, at least one memory storing computer program code, with the at least one memory and the computer program code configured to, with the processor, cause the apparatus to at least receive a plurality of instances of probe data. Each instance of probe data is provided by and/or received from a probe apparatus of a plurality of probe apparatuses. The probe apparatus comprises a plurality of sensors and is onboard a vehicle. An instance of the plurality of instances of probe data comprises location information indicating a location of the corresponding probe apparatus. The at least one memory and the computer program code are further configured to, with the processor, cause the apparatus to, for each of one or more instances of the plurality of instances of probe data, determine a distance parameter based on the location information and a road segment corresponding to the location. The at least one memory and the computer program code are further configured to, with the processor, cause the apparatus to define a set of distance parameters based on the distance parameter determined for each of the one or more instances of the plurality of instances of probe data; analyze the set of distance parameters to identify clusters of probe data; determine the number of clusters identified; and compare the number of clusters identified to a historical number of clusters. The at least one memory and the computer program code are further configured to, with the processor, cause the apparatus to, responsive to determining that the number of clusters identified satisfies a threshold based upon the historical number of clusters, determine that a lane closure event is occurring.

In an example embodiment, the location information is determined by a global navigation satellite system (GNSS) sensor onboard the vehicle. In an example embodiment, the at least one memory and the computer program code are further configured to, with the processor, cause the apparatus to determine the distance parameter by identifying a position on a link of a digital map corresponding to the road segment based on the location information; determine a distance between the position and the location; and assign the distance parameter the value of the determined distance. In an example embodiment, the position is located on a reference line corresponding to the road segment and the distance is equal to the length of a line extending from the position to the location, wherein the line is perpendicular to the reference line. In an example embodiment, the reference line corresponds to the middle of the road segment.

In an example embodiment, the plurality of instances of probe data are received within a configurable time period and the global navigation satellite system (GNSS) satellite coverage of the road segment is approximately constant over the configurable time period. In an example embodiment, the configurable time period is within the range one minute to eighty minutes (e.g., 5 minutes, 10 minutes, 30 minutes, 60 minutes). In an example embodiment, the configurable time period is within five minutes to thirty minutes. In an example embodiment, in response to determining that a lane closure event is occurring, the at least one memory and the computer program code are further configured to, with the processor, cause the apparatus to provide a closure notification to a computing entity, wherein, when the closure notification is processed by the computing entity, the closure notification causes the computing entity to (a) perform one or more route calculations, (b) provide a closure alert, or (c) both.

In an example embodiment, to analyze the set of distance parameters to identify clusters of probe data the at least one memory and the computer program code are further configured to, with the processor, cause the apparatus to generate a one dimensional array from the set of distance parameters; converting the one dimensional array to a positive array; segment the elements of the positive array into a set of buckets; determine if pairs of adjacent buckets of the set of buckets are spatially distinct; responsive to determining that a pair of adjacent buckets are not spatially distinct, combine the pair of adjacent buckets into one bucket; and responsive to determining that a pair of adjacent buckets are spatially distinct, define a cluster based on at least one of the buckets of the pair of adjacent buckets.

In accordance with an example embodiment, a computer program product is provided that comprises at least one non-transitory computer-readable storage medium having computer-executable program code instructions stored therein with the computer-executable program code instructions comprising program code instructions configured to receive a plurality of instances of probe data. Each instance of probe data is provided by and/or received from a probe apparatus of a plurality of probe apparatuses. The probe apparatus comprises a plurality of sensors and is onboard a vehicle. An instance of the plurality of instances of probe data comprises location information indicating a location of the corresponding probe apparatus. The computer-executable program code instructions further comprise program code instructions configured to, for each of one or more instances of the plurality of instances of probe data, determine a distance parameter based on the location information and a road segment corresponding to the location. The computer-executable program code instructions further comprise program code instructions configured to define a set of distance parameters based on the distance parameter determined for each of the one or more instances of the plurality of instances of probe data; analyze the set of distance parameters to identify clusters of probe data; determine the number of clusters identified; and compare the number of clusters identified to a historical number of clusters. The computer-executable program code instructions further comprise program code instructions configured to responsive to determining that the number of clusters identified satisfies a threshold based upon the historical number of clusters, determine that a lane closure event is occurring.

In an example embodiment, the location information is determined by a global navigation satellite system (GNSS) sensor onboard the vehicle. In an example embodiment, the computer-executable program code instructions further comprise program code instructions configured to determine the distance parameter by identifying a position on a link of a digital map corresponding to the road segment based on the location information; determine a distance between the position and the location; and assign the distance parameter the value of the determined distance. In an example embodiment, the position is located on a reference line corresponding to the road segment and the distance is equal to the length of a line extending from the position to the location, wherein the line is perpendicular to the reference line. In an example embodiment, the reference line corresponds to the middle of the road segment.

In an example embodiment, the plurality of instances of probe data are received within a configurable time period and the global navigation satellite system (GNSS) satellite coverage of the road segment is approximately constant over the configurable time period. In an example embodiment, the configurable time period is within the range one minute to eighty minutes (e.g., 5 minutes, 10 minutes, 30 minutes, 60 minutes). In an example embodiment, the configurable time period is within the range of five minutes to thirty minutes. In an example embodiment, the computer-executable program code instructions further comprise program code instructions configured to, in response to determining that a lane closure event is occurring, provide a closure notification to a computing entity, wherein, when the closure notification is processed by the computing entity, the closure notification causes the computing entity to (a) perform one or more route calculations, (b) provide a closure alert, or (c) both.

In an example embodiment, to analyze the set of distance parameters to identify clusters of probe data the computer-executable program code instructions comprise program code instructions configured to generate a one dimensional array from the set of distance parameters; converting the one dimensional array to a positive array; segment the elements of the positive array into a set of buckets; determine if pairs of adjacent buckets of the set of buckets are spatially distinct; responsive to determining that a pair of adjacent buckets are not spatially distinct, combine the pair of adjacent buckets into one bucket; and responsive to determining that a pair of adjacent buckets are spatially distinct, define a cluster based on at least one of the buckets of the pair of adjacent buckets.

BRIEF DESCRIPTION OF THE DRAWINGS

Figure 1:
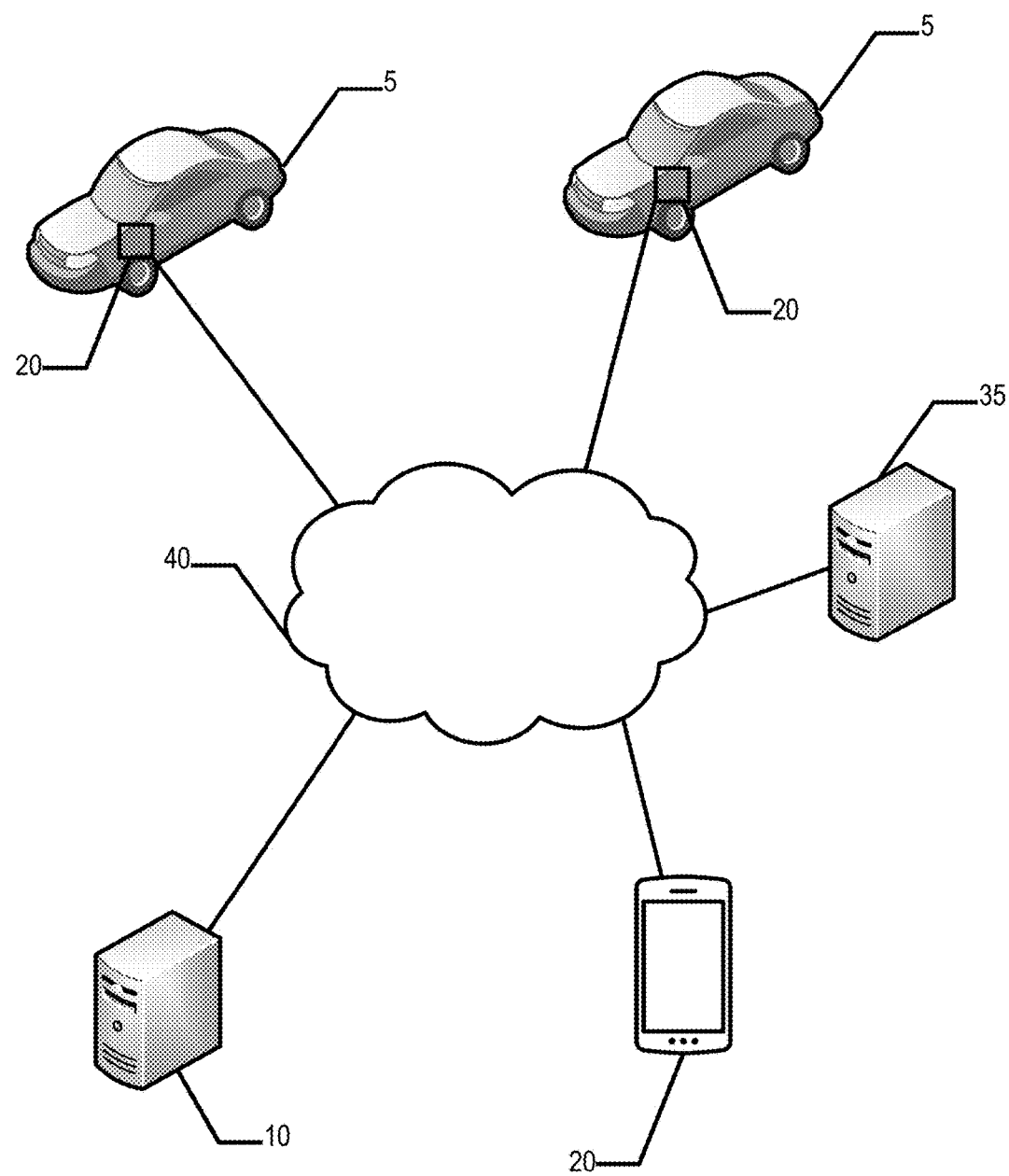
Figure 2A:
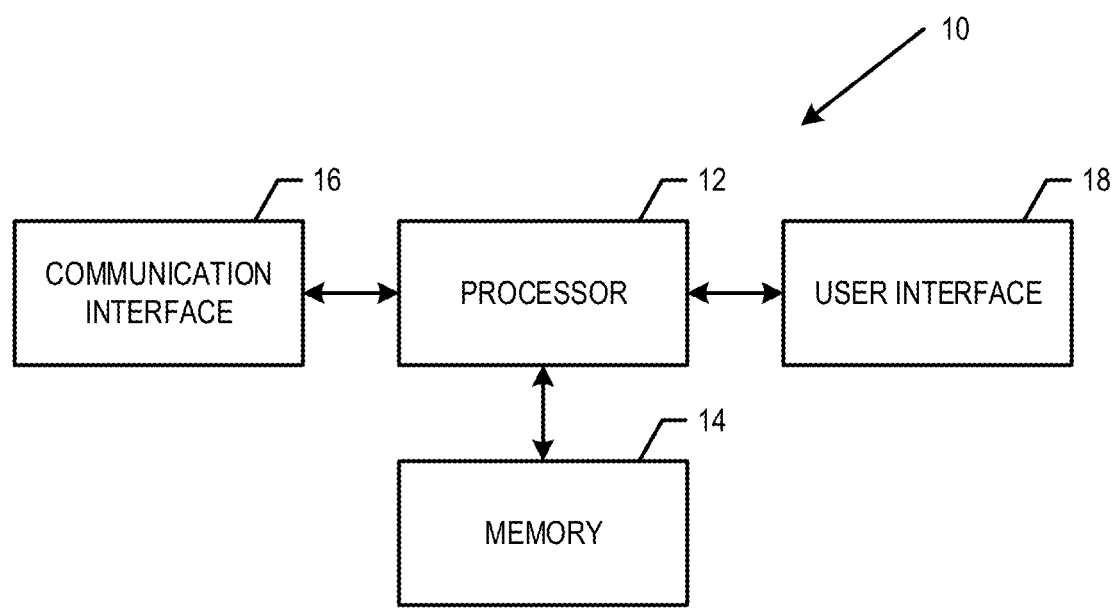
Figure 2B:
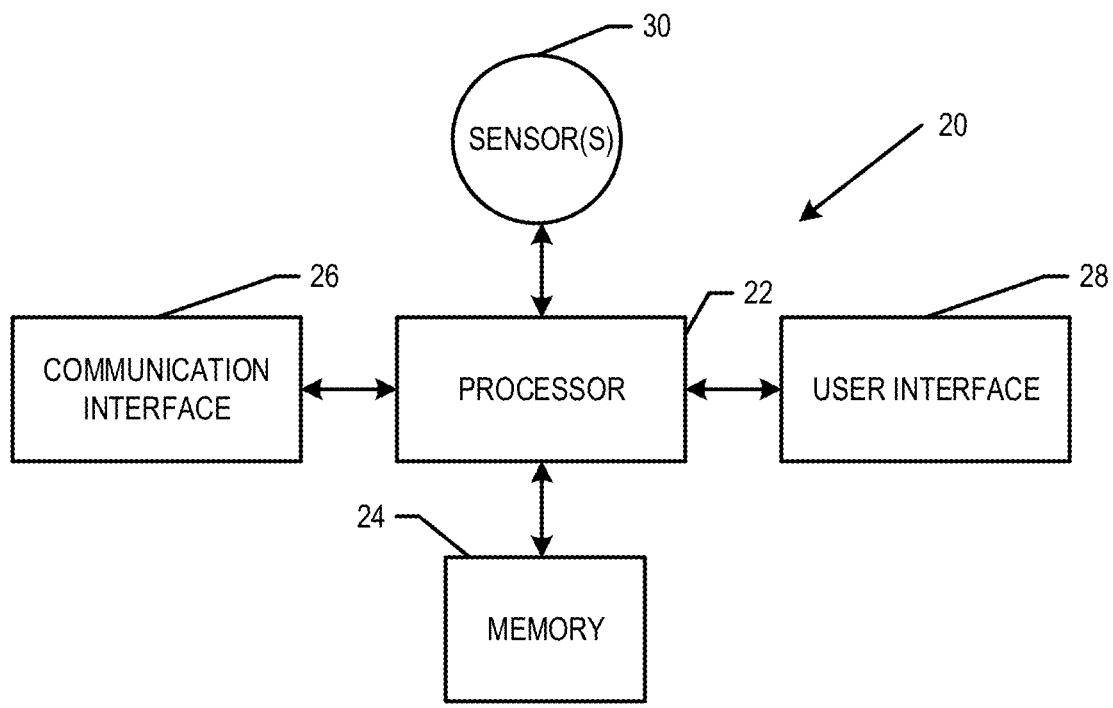
Figure 5:
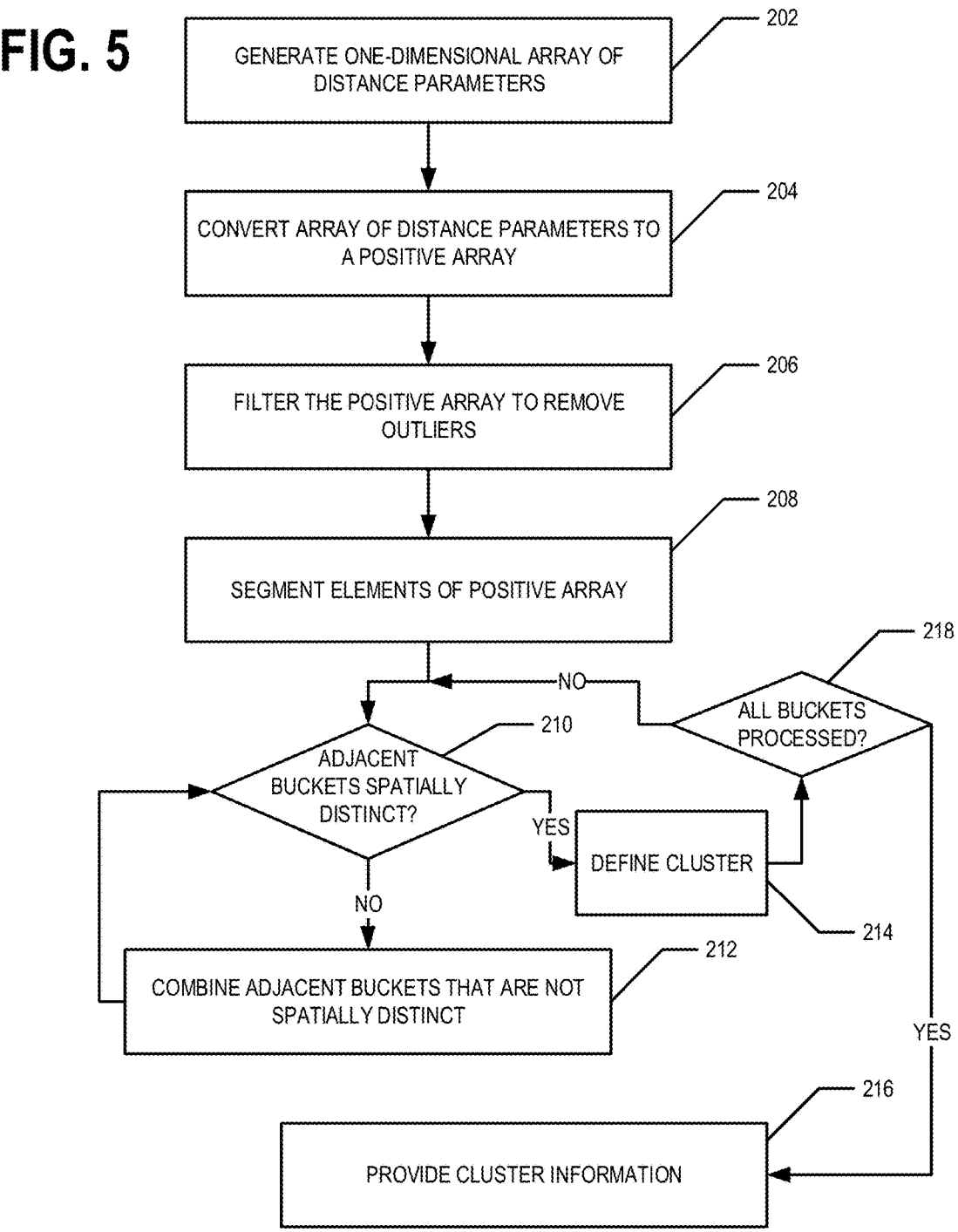

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of an apparatus that may be specifically configured in accordance with an example embodiment;

FIG. 2B is a block diagram of a probe apparatus that may be specifically configured in accordance with an example embodiment;

FIG. 3 is a flowchart illustrating operations performed, such as by the apparatus of FIG. 2A to identify lane closures based on probe information/data, in accordance with an example embodiment;

FIG. 4A is a diagram of an example portion of a road segment that is not experiencing a lane closure, in accordance with an example embodiment;

FIG. 4B is a diagram of an example portion of a road segment that is experiencing a lane closure, in accordance with an example embodiment;

FIG. 5 is a flowchart illustrating operations performed, such as by the apparatus of FIG. 2A to identify spatial clusters within the probe information/data, in accordance with an example embodiment;

FIG. 6 provides example pseudocode for identifying spatial clusters within the probe information/data, in accordance with an example embodiment; and FIGS. 7A, 7B, 7C, 7D, and 7E each provide a block diagram illustrating various blocks of FIG. 5 and/or example pseudocode blocks of FIG. 6.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

I. General Overview

Methods, apparatus and computer program products are provided in accordance with an example embodiment in order to automatically identify lane closures and/or road closures in real time or near real time. For example, a plurality of instances of probe information/data may be received from probe apparatuses traveling along a road segment onboard vehicles. An instance of probe information/data may comprise location information/data. For example, the probe information/data may comprise a geo-physical location (e.g., latitude and longitude) indicating the location of the probe apparatus at the time that the probe information/data is generated and/or provided (e.g., transmitted). Spatial clusters within the probe information/data may be identified based on analyzing the probe information/data. The number of spatial clusters identified may be compared to the number of spatial clusters that have historically been identified for the road segment. For example, each spatial cluster may represent a lane of the road segment. Thus, if fewer spatial clusters are identified and/or detected than have historically been identified and/or detected, one or more lanes along the road segment may be closed. If no spatial clusters are identified for the road segment, the road segment may be closed. After a lane and/or road segment closure is identified, a closure notification may be provided.

FIG. 1 provides an illustration of an example system that can be used in conjunction with various embodiments of the present invention. As shown in FIG. 1, the system may include a plurality of probe apparatuses 20, one or more apparatuses 10, one or more other computing entities 35, one or more networks 40, and/or the like. In various embodiments, the probe apparatus 20 may be an in vehicle navigation system, vehicle control system, a mobile computing device, and/or the like. For example, a probe apparatus 20 may be an in vehicle navigation system mounted within and/or be on-board a vehicle 5 such as a motor vehicle, non-motor vehicle, automobile, car, scooter, truck, van, bus, motorcycle, bicycle, Segway, golf cart, and/or the like. In various embodiments, the probe apparatus 20 may be a smartphone, tablet, personal digital assistant (PDA), and/or other mobile computing device. In another example, the probe apparatus 20 may be a vehicle control system configured to autonomously drive a vehicle 5, assist in control of a vehicle 5, and/or the like. In example embodiments, a probe apparatus 20 is onboard a dedicated probe vehicle. In some embodiments, a probe apparatus 20 may be onboard a personal vehicle, commercial vehicle, public transportation vehicle, and/or other vehicle. In an example embodiment, a probe apparatus 20 is any apparatus that provides (e.g., transmits) probe information/data to the apparatus 10.

In an example embodiment, an apparatus 10 may comprise components similar to those shown in the example apparatus 10 diagrammed in FIG. 2A. In an example embodiment, the apparatus 10 is configured to provide map updates, identify lane closures and/or road closures, provide closure notifications, and/or the like to the probe apparatus 20 and/or computing entity 35. In an example embodiment, a probe apparatus 20 may comprise components similar to those shown in the example probe apparatus 20 diagrammed in FIG. 2B. In various embodiments, the apparatus 10 may be located remotely from the probe apparatus 20. Each of the components of the system may be in electronic communication with, for example, one another over the same or different wireless or wired networks 40 including, for example, a wired or wireless Personal Area Network (PAN), Local Area Network (LAN), Metropolitan Area Network (MAN), Wide Area Network (WAN), cellular network, and/or the like. In some embodiments, a network 40 may comprise the automotive cloud, digital transportation infrastructure (DTI), radio data system (RDS)/high definition (HD) radio or other digital radio system, and/or the like. For example, a probe apparatus 20 may be in communication with an apparatus 10 via the network 40. For example, the probe apparatus 20 may communicate with the apparatus 10 via a network, such as the Cloud. For example, the Cloud may be a computer network that provides shared computer processing resources and data to computers and other devices connected thereto. For example, the probe apparatus 20 may be configured to receive one or more map tiles of a digital map from the apparatus 10 and/or provide probe information/data to the apparatus 10.

In an example embodiment, as shown in FIG. 2B, the probe apparatus 20 may comprise a processor 22, memory 24, a communications interface 26, a user interface 28, one or more sensors 30 (e.g., a location sensor such as a GNSS sensor; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; and/or other sensors that enable the probe apparatus 20 to determine one or more features of the corresponding vehicle's 5 surroundings), and/or other components configured to perform various operations, procedures, functions or the like described herein. In at least some example embodiments, the memory 24 is non-transitory.

Similarly, as shown in FIG. 2A, the apparatus 10 may comprise a processor 12, memory 14, a user interface 18, a communications interface 16, and/or other components configured to perform various operations, procedures, functions or the like described herein. In at least some example embodiments, the memory 14 is non-transitory. The computing entity 35 may comprise similar elements to the apparatus 10 and/or the probe apparatus 20. For example, the computing entity 35 may comprise a processor, memory, a user interface, a communications interface, and/or the like. In example embodiments, the computing entity 35 may comprise one or more sensors similar to sensor(s) 30. Certain example embodiments of the probe apparatus 20 and the apparatus 10 are described in more detail below with respect to FIGS. 2A and 2B.

II. Example Operation

In at least some example embodiments, probe information/data may be analyzed to identify lane and/or road closures. In an example embodiment, a probe apparatus 20 may provide (e.g., transmit) probe information/data to an apparatus 10. The probe information/data may comprise at least one of a probe identifier configured to identify the probe apparatus 20, a link identifier configured to identify the digital map link representing the road segment the probe apparatus 20 is travelling along, a location such as a geophysical location of the probe apparatus 20 (e.g., determined by a location sensor 30), a travel speed of the probe apparatus 20 and/or the corresponding vehicle 5 travelling along at least a portion of the road segment, and/or the like. In example embodiments, the travel speed may be an instantaneous travel speed, an average travel speed over a short time interval (e.g., 10 seconds, 30 seconds, one minute, and/or the like), an average speed over a short distance interval (e.g., along the length of road segment, along a portion of the pre-intersection road segment, and/or the like). In example embodiments, the travel speed may be determined by one or more sensors 30 (e.g., GNSS, IMU, and/or the like), by the vehicle's 5 speedometer, and/or the like.

In an example embodiment, the probe information/data is analyzed in time bins. For example, the instances of probe information/data received during a one minute, five minute, ten minute, and/or the like period may be binned together and/or analyzed together. In particular, the time bins may be short enough that the movement of GNSS satellites providing coverage for the road segment is small and/or negligible over the configurable time period that defines the time bin. For example, the GNSS coverage of the road segment may be approximately constant over a configurable time period equal to the temporal length of the time bin.

In an example embodiment, a plurality of instances of probe information/data (within a time bin) may be analyzed to identify spatial clusters within the plurality of instances of probe information/data. For example, the instances of probe information/data may be clustered based on location information/data associated with each instance of probe information/data. For example, the instances of probe information/data may be clustered based on a distance parameter d determined based on the location information/data of the corresponding instance of probe information/data. For example, the distance parameter d may be determined by determining the distance between (a) the location indicated by the location information/data of an instance of probe information/data and (b) a reference line of a road segment. In an example embodiment, the reference line of a road segment may be a center line of the road segment, a right hand edge of the road segment, a left hand edge of the road segment, and/or another reference line of the road segment. In an example embodiment, the distance parameter d may indicate a relative position of the location information/data relative to the road segment and/or the reference line. The set of distance parameters {d} corresponding to a plurality of probe apparatuses 20 and/or vehicles 5 may be analyzed to identify spatial clusters of probe apparatuses 20 and/or vehicles 5 travelling the road segment. For example, in FIGS. 4A and 4B each dot 60 indicates the location of a probe apparatus 20 and/or vehicle 5 according to an instance of probe information/data. The set of distance parameters {d} may be determined by determining the distance d between each dot 60 and a corresponding point on the reference line 55. In particular, the distance between a dot 60 and the reference line 55 may be the distance of a line that is perpendicular or normal to the reference line 55 and extends from the reference line 55 to the point 60. In an example embodiment, points located on a first side of the reference line 55 (e.g., to the left of the reference line 55)

may be assigned a negative distance parameter and points located on a second side of the reference line (e.g., to the right of the reference line 55) may be assigned a positive distance parameter. The set of distance parameters {d} may be analyzed to identify spatial clusters 50 (e.g., 50A, 50B, 50C, 50D). For example, vehicles 5 traveling in a particular lane along a road segment will have a similar distance from and/or position relative to a reference line 55 of the road segment. Thus, when spatial clusters of instances of probe information/data are identified based on the distance parameter d corresponding to each instance of probe information/data, lane level traffic information/data may be determined for the road segment.

As noted above, the 95% confidence interval of a GPS-determined location is generally twice the width of a lane of traffic. Thus, the location information/data cannot be directly analyzed to determine the travel lane of the corresponding probe apparatus 20 and/or vehicle 5 along the road segment. However, by analyzing a plurality of instances of probe information/data captured, received, and/or provided (e.g., transmitted) within a configurable time period (e.g., one minute, five minutes, 10 minutes), based on a relative location indicator such as the distance parameter d, spatial clusters representing lanes of the road segment may be identified. The probe information/data assigned to each spatial cluster may then be analyzed to determine lane level traffic information/data and to provide appropriate notifications and/or perform other actions.

For example, the spatial clusters for a current time bin may be determined, identified, and/or the like by analyzing the location information/data corresponding to the plurality of instances of probe information/data assigned to the current time bin. In an example embodiment, the current time bin may be the time bin corresponding to a configurable time period that just concluded. For example, the instances of probe information/data corresponding to the time bin 1:15:00-1:15:59 may be analyzed starting at 1:16:00 as the current time bin. In another example, the instances of probe information/data of the current time bin may be analyzed as they are received. For example, the instances of probe information/data corresponding to the time bin 1:15:00-1:19:59 may be analyzed as the current time bin as each instance of probe information/data is received. As should be understood, the analysis of the probe information/data for a time bin may be completed according to various schedules, as appropriate for the application. In an example embodiment, the analysis may be completed in real time or near real time. Moreover, while described in conjunction with real time or near real time application, some example embodiments may be implemented in other scenarios.

After the spatial clusters of the current time bin have been determined, identified, generated, and/or the like, the number of spatial clusters within the current time bin may be compared to the number of spatial clusters in historical probe information/data. For example, spatial cluster information/data from previous time bins (e.g., earlier in the same day, the previous day, the previous week, a few months ago, and/or the like) may be stored by the apparatus 10. Thus, the historical number of spatial clusters may be determined. Moreover, historical traffic information/data regarding the spatial clusters may be determined. Thus, current lane level traffic information/data may be compared against historical lane level traffic information/data for the road segment on a lane-by-lane basis if desired. If the current number of spatial clusters (e.g., the number of spatial clusters identified, determined, generated, and/or the like within the current time bin) is less than the historical number of spatial clusters, it is possible that the spatial cluster(s) not present in the current time bin correspond to one or more lanes that are closed. For example, one or more lanes of a road segment may be closed due to construction, a special event, an accident, debris in the road, and/or the like. In an example embodiment, the probe information/data may be analyzed to determine the impact of the one or more lane closures. For example, lane level traffic information/data may be analyzed to determine the impact of the one or more lane closures. In an example embodiment, if the current number of spatial clusters is zero, it may be determined that all of the lanes of a road segment are closed and/or the road segment is closed.

After and/or responsive to identifying, determining, and/or the like that one or more lanes of a road segment are closed, a closure notification comprising information/data relating to the lane closure and/or corresponding traffic information/data may be provided to one or more computing entities 35. For example, a computing entity 35 may be a probe apparatus 20 (e.g., corresponding to a vehicle 5 that is approaching the road segment affected by the one or more lane closures and/or expected to travel through the road segment affected by the one or more lane closures on a current trip or an expected trip, and/or the like) or a traffic management apparatus. For example, the computing entity 35 may be a traffic management apparatus that is operated by and/or on behalf of a traffic management agency (e.g., a local department of transportation, city traffic management office, and/or the like). In example embodiments, the closure notification may comprise computer-executable code and/or reference computer-executable code that, when executed by the computing entity 35 may cause the computing entity 35 to provide a closure alert through a user interface thereof (e.g., a display, audible alert, and/or the like). For example, the closure alert may indicate that one or more lanes are closed on the road segment, indicate which lanes of the road segment are closed (middle lane, right lane, second left lane, and/or the like), a closure type corresponding to the lane closure(s) (e.g., planned, unplanned, construction, special event, accident, and/or the like), provide information/data regarding the impact of the lane closure (e.g., a travel speed in the vicinity of the lane closure, additional amount of travel time expected due to lane closure(s), and/or the like), and/or the like. In an example embodiment, the computing entity 35 may, responsive to receiving the closure notification and/or in response to executing the computer-executable therein and/or referenced thereby, perform one or more route planning computations, determinations, and/or the like. For example, a route planning computation, determination, and/or the like may comprise re-calculating a route, determining an updated travel and/or expected arrival time, and/or the like.

In an example embodiment, a computing entity 35 may provide information/data related to planned lane closures. For example, the computing entity 35 may correspond to a traffic management agency and provide information/data that indicates that a construction or special event closure is planned for a particular street. This information/data tends to not indicate which particular road segment or which lane will be affected. However, this information/data may be used to determine if a detected lane closure is likely to be a planned lane closure. For example, if a lane closure is detected along a road segment corresponding to First Avenue and it is known that a closure is planned for First Avenue, it may be determined that the lane closure is a planned lane closure. However, if no lanes closures are planned for First Avenue it may be determined that the lane closure detected along the road segment corresponding to First Avenue is not a planned closure. For example, the closure may be due to a traffic incident (e.g., an accident), debris on the road, and/or the like. In an example embodiment, in response to determining that a detected lane closure is not a planned closure, the apparatus 10 may provide the computing entity 35 that corresponds to traffic management agency with an unplanned closure notification. Receipt and/or processing of the unplanned closure notification by the computing entity 35 may trigger an investigation of the detected lane closure through traffic cameras, a team travelling to the site of the lane closure, and/or the like. Steps may then be taken to remedy the incident, remove the road debris, and/or the like that caused the unplanned lane closure.

In some embodiments, the apparatus 10 may track the impact on traffic of identified lane closures. For example, identified lane closures may be analyzed to determine if a lane closure for a particular lane or during a particular time of the day or week appears to cause a disproportionate impact on travel along the road segment (e.g., greatly reduces travel speed, causes significant traffic jams, and/or the like). In an example embodiment, the apparatus 10 may provide information/data related to the impact of lane closures to a computing entity 35 corresponding to a traffic management agency. Such information/data may be used to plan future lane closures for construction and/or other plannable lane closures to mitigate the impact on traffic in the vicinity of the lane closure.

Identifying a Lane Closure

FIG. 3 provides a flowchart illustrating processes and procedures that may be completed, for example by an apparatus 10 to identify or detect a lane closure, to inform route planning decisions based on an identified and/or detected lane closure, remedying an unplanned closure, and/or planning lane closures to provide a minimized impact to traffic. Starting at block 102, a plurality of instances of probe information/data are received. For example, the apparatus 10 may receive a plurality of instances of probe information/data. Each instance of probe information/data may be provided by a probe apparatus 20 onboard a vehicle 5. For example, the apparatus 10 may comprise means, such as processor 12, communications interface 16, and/or the like, for receiving a plurality of instances of probe information/data. In an example embodiment, the probe information/data may comprise at least one of a probe identifier configured to identify the probe apparatus 20, a link identifier configured to identify the digital map link representing the road segment the probe apparatus 20 is travelling along, a location such as a geophysical location of the probe apparatus 20 (e.g., determined by a location sensor 30), a travel speed of the probe apparatus 20 and/or the corresponding vehicle 5 travelling along at least a portion of the road segment, and/or the like. In an example embodiment, the probe information/data is analyzed in time bins. For example, the instances of probe information/data received during a one minute, five minute, ten minute, and/or the like configurable time period may be binned together and/or analyzed together. In particular, the time bins may be short enough that the movement of GNSS satellites providing coverage for the road segment is small and/or negligible across the configurable time period of the time bin. For example, the GNSS coverage of the road segment may be approximately constant over a configurable time period equal to the temporal length of the time bin.

In an example embodiment, instances of probe information/data corresponding to probe apparatuses 20 and/or vehicles 5 travelling a road segment in a first direction may be analyzed separately from instances of probe information/data corresponding to probe apparatuses 20 and/or vehicles 5 travelling the road segment in a second, opposite direction. For example, the probe information/data may comprise a probe identifier configured to identify the corresponding probe apparatus 20 and/or vehicle 5. The probe identifier may be used to identify a series (e.g., two or more instances) of probe information/data received over a time interval. For example, a probe apparatus 20 may provide probe information/data every tenth of a second, every second, every minute, every five minutes, and/or the like, thereby providing a series of probe information/data having a known temporal sequence. The location information/data corresponding with the series of instances of probe information/data may be used to determine the direction along a road segment in which the corresponding probe apparatus 20 and/or vehicle 5 is travelling. The plurality of instances of probe information/data may then be separated based on the travel direction of the corresponding probe apparatuses 20 and/or vehicles 5 and each travel direction may be analyzed independently. For example, as shown in FIGS. 4A and 4B, spatial clusters 50A and 50B may correspond to a first lane and a second lane of a road segment that are travel lanes for a first travel direction. The spatial clusters 50C and 50D may corresponding to a third lane and a fourth lane of the road segment that are travel lanes for a second travel direction. In some embodiments, the road segment may be a divided highway, one way road, and/or the like such that all probe information/data corresponding to a particular road segment are provided by probe apparatuses 20 traveling in the same direction. In such scenarios, spatial clusters 50A, 50B, 50C, and 50D may all correspond to travel lanes for one travel direction.

At block 104, the set of distance parameters {d} is determined based on the location information/data corresponding to each instance of at least a subset of the plurality of instances of probe information/data. For example, the apparatus 10 may determine the set of distance parameters {d} based on the location information/data corresponding to instances of probe information/data. For example, the apparatus 10 my comprise means, such as the processor 12 and/or the like, for determining a set of distance parameters {d} based on the location information/data corresponding to instances of probe information/data. In an example embodiment, the distance parameter d corresponding to an instance of probe information/data may be defined by the distance between (a) the location indicated by the location information/data of the instance of probe information/data and (b) a reference line of a road segment. In an example embodiment, the reference line of a road segment may be a center line of the road segment, a right hand edge of the road segment, a left hand edge of the road segment, and/or another reference line of the road segment. In an example embodiment, the distance parameter d may indicate a relative position of the location information/data relative to the road segment and/or the reference line. In an example embodiment, the distance parameter d corresponding to an instance of probe information/data may be determined by map matching the location information/data of the instance of probe information/data to the digital map. For example, the location information/data may be used to identify a position (e.g., latitude and longitude) along a link of a digital map representing a road segment the probe apparatus 20 and/or vehicle 5 is travelling along. The link may be defined by a line in latitude and longitude space. In an example embodiment, this line may be used as the reference line for the road segment. Thus, in an example embodiment, the distance parameter d may be determined, computed, and/or the like by identifying a position along the link (e.g., a map-matched position) corresponding to the location information/data and then determining the distance from the position along the link (e.g., the map-matched position) to the location indicated by the location information/data. For example, the distance parameter $d_i$ corresponding to instance i of the probe information/data may be determined, computed, and/or the like by $d_i$=Distance (position (map-match), location (location information/data)). In various embodiments, the distance parameter $d_i$ corresponding to instance i of probe information/data may be determined based on the corresponding location information/data using a variety of techniques. Additionally, it should be understood that the terms location and position are used interchangeably herein.

As noted above, by analyzing the probe information/data using a relative parameter (e.g., the distance parameter d) and/or by analyzing the probe information/data in time bins over which the GNSS coverage of the road segment is approximately constant and/or changes very little, the error in the GNSS-determined location information/data may be mitigated. In particular the error in the GNSS-determined location information/data may be mitigated such that the lanes of traffic for a road segment may be relatively defined with respect to the other lanes of traffic of the road segment and/or historical lanes of traffic of the road segment.

At step 106, the set of distance parameters {d} may be analyzed to identify, determine, detect, generate, and/or the like spatial clusters of instances of probe information/data. In particular, a spatial cluster may comprise instances of probe information/data (and/or portions and/or indicators thereof) for which the corresponding probe apparatuses 20 and/or vehicles 5 traveled at least a section of the corresponding road segment in a position relative to a reference line of the road segment that are similar. For example, as shown in FIGS. 4A and 4B, spatial clusters 50 (e.g., 50A, 50B, 50C, 50D) may be identified, determined, detected, generated, and/or the like based on the set of distance parameters {d}. For example, the apparatus 10 may analyze the set of distance parameters {d} to identify, determine, detect, generate, and/or the like spatial clusters of instances of probe information/data. For example, the apparatus 10 may comprise means, such as processor 12 and/or the like, for analyzing the set of distance parameters {d} to identify, determine, detect, generate and/or the like spatial clusters of instances of probe information/data. As should be understood various methods may be used for identifying, determining, detecting, generating and/or the like spatial clusters based on an analysis of the set of distance parameters {d}. Some non-limiting examples of techniques for identifying, determining, detecting, generating and/or the like spatial clusters based on an analysis of the set of distance parameters {d} are discussed in more detail below with regard to FIGS. 5 and 6.

Continuing with FIG. 3, at block 108, historical spatial cluster information/data may be accessed. For example, the memory 14 and/or other memory accessible to processor 12 may store historical spatial cluster information/data. For example, the historical spatial cluster information/data may comprise spatial cluster information/data from previous time bins (e.g., earlier in the same day, the previous day, the previous week, a few months ago, and/or the like) may be stored by the apparatus 10. In example embodiments, spatial cluster information/data may include, the number of clusters identified, instances of probe information/data organized into spatial clusters, distribution information/data indicating the relative location of spatial clusters for the road segment (e.g., the mean distance parameter d for the cluster and/or a standard of deviation or other measure of variance of distance parameters d within the cluster), and/or other information/data corresponding to detected spatial clusters. In particular, the historical spatial cluster information/data may indicate a number of historical spatial clusters identified, detected, determined, generated, and/or the like for the road segment. For example, the apparatus 10 may access historical spatial cluster information/data. For example, the apparatus 10 may comprise means, such as processor 12, memory 14, communications interface 16, and/or the like, for accessing historical spatial cluster information/data.

At block 110, it may be determined if the current number of spatial clusters identified, detected, generated, determined, and/or the like in the current time bin (referred to herein as the current number of clusters) satisfies a threshold based upon the number of historical spatial clusters identified, detected, determined, generated, and/or the like for the road segment (referred to herein as the historical number of clusters). For example, the apparatus 10 may determine, based at least in part on the accessed historical cluster information/data, if the current number of clusters satisfies a threshold based upon the historical number of clusters. For example, the apparatus 10 may comprise means, such as the processor 12 and/or the like, for determining if the number of current clusters satisfies a threshold based upon the historical number of clusters for the road segment. In an example embodiment, it may be determined if the current number of clusters is less than the historical number of clusters.

In an example embodiment, the historical cluster information/data accessed may correspond to a similar day of the week, time of day, and/or the like as the current time bin. For example, the road segment may comprise a shoulder lane that is only used as a travel lane during evening rush hour. Thus, if the historical number of clusters corresponding to evening rush hour traffic was compared to the current number of clusters corresponding to morning traffic, an extraneous lane closure would be detected. Similarly, if the historical number of clusters corresponding to morning traffic is compared to the current number of clusters corresponding to evening rush hour traffic, an extra lane would be identified and/or a lane closure of the non-shoulder lane may be overlooked.

If, at block 110, it is determined that the current number of clusters is not less than the historical number of clusters, the process continues to block 112. At block 112, it is determined that there are no lane closures currently corresponding to the road segment. For example, responsive to determining that the current number of clusters is not less than the historical number of clusters for a road segment, the apparatus 10 may determine that there are no current lane closures corresponding to the road segment. For example, the apparatus 10 may comprise means, such as processor 12 and/or the like, for determining that, responsive to determining that the current number of clusters is not less than the historical number of clusters for a road segment, the apparatus 10 may determine that are no current lane closures corresponding to the road segment. The process may then end and/or return to block 102 and/or 104 for receiving and/or processing, analyzing and/or the like additional instances of probe information/data and/or the next time bin of instances of probe information/data.

If at block 110, it is determined that the current number of clusters satisfies a threshold based upon the historical number of clusters, the process continues to block 114. At block 114, it is determined that there is a current potential lane closure corresponding to the road segment. For example, responsive to determining that the current number of clusters is less than the historical number of clusters for a road segment, the apparatus 10 may determine that there is a current lane closure corresponding to the road segment. For example, the apparatus 10 may comprise means, such as processor 12 and/or the like, for determining that, responsive to determining that the current number of clusters is less than the historical number of clusters for a road segment, determining that there is a current lane closure corresponding to the road segment. In an example embodiment, the number of closed lanes may be determined and/or the closed lanes may be identified based on comparing the current spatial cluster information/data to the historical spatial cluster information/data. For example, FIG. 4A provides historical spatial cluster information/data for a road segment identifying spatial clusters 50A, 50B, 50C, and 50D. FIG. 4B shows the current cluster information/data for the same road segment. However, in FIG. 4B, only spatial clusters 50A, 50B, and 50C were identified. As the historical spatial cluster information/data indicates that the historical number of clusters is four and the current number of clusters is three, it is determined that a lane of the road segment is potentially currently closed. By comparing the historical spatial cluster information/data to the current spatial cluster information/data, it is determined that cluster 50D is missing from the currently identified and/or detected spatial clusters. For example, it is determined that there are none or very few probe apparatuses 20 and/or vehicles 5 currently travelling the road segment in the lane corresponding to cluster 50D. It may therefore be assumed that the lane corresponding to cluster 50D is closed. Lane closure 65 may therefore be detected and/or identified. In an example embodiment, a closure type corresponding to one or more lane closure(s) may be determined.

At block 116, a closure notification may be provided (e.g., transmitted) to one or more computing entities 35. For example, the apparatus 10 may provide one or more closure notifications to one or more computing entities 35. For example, the apparatus 10 may comprise means, such as processor 12, communications interface 16, and/or the like, for providing one or more closure notifications to one or more computing entities 35. In an example embodiment, the one or more closure notifications may be triggered in response to identifying and/or detecting a lane closure. In example embodiments, the closure notification may identify the road segment experiencing the lane closure, the lane(s) affected by the lane closure, the type of lane closure (e.g., construction, special event, traffic incident, planned, unplanned, and/or the like), and/or other information/data corresponding to the lane closure.

For example, a computing entity 35 may be a probe apparatus 20 (e.g., corresponding to a vehicle 5 that is approaching the road segment affected by the one or more lane closures and/or expected to travel through the road segment affected by the one or more lane closures on a current trip or an expected trip, and/or the like) or a traffic management apparatus. For example, the computing entity 35 may be a computing entity that is operated by and/or on behalf of a traffic management agency (e.g., a local department of transportation, city traffic management office, and/or the like). In example embodiments, the closure notification may comprise computer-executable code and/or reference computer-executable code that, when executed by the computing entity 35 may cause the computing entity 35 to provide a closure alert through a user interface thereof (e.g., a display, audible alert, and/or the like). For example, the closure alert may indicate that one or more lanes are closed on the road segment, indicate which lanes of the road segment are closed (middle lane, right lane, second left lane, and/or the like), provide information/data regarding the impact of the lane closure (e.g., a travel speed in the vicinity of the lane closure, additional amount of travel time expected due to lane closure(s), and/or the like).

In an example embodiment, the computing entity 35 may, responsive to receiving the closure notification and/or responsive to executing the computer-executable code therein and/or referenced thereby, perform one or more route planning computations, determinations, and/or the like. For example, a route planning computation, determination, and/or the like may comprise re-calculating a route (e.g., a route from a start location and/or the current location to a destination location), determining an updated arrival or travel time, and/or the like. For example, in an example embodiment, an application may be operating on the computing entity 35 that has access to a library of computer-executable code. The closure notification may reference computer-executable code accessible through the library that the application may then access and execute to cause the computing entity 35 to provide a closure alert through a user interface thereof and/or to perform one or more route planning computations, determinations, and/or the like. After providing the one or more closure notifications, the process may end, in an example embodiment. In another example embodiment, after providing the one or more closure notifications, the apparatus 10 may receive and/or analyze another time bin of probe information/data.

In an example embodiment, a computing entity 35 may provide information/data related to planned lane closures. For example, the computing entity 35 may correspond to a traffic management agency and provide information/data that indicates that a construction or special event closure is planned for a particular street. In an example embodiment, the planned lane closure information/data may be used to determine a closure type for the identified and/or detected lane closure(s). For example, the identified and/or detected lane closure(s) that can be matched to planned lane closure information/data may be labeled as planned, construction, special event, and/or the like, in accordance with corresponding planned lane closure information/data. Such matching with planned lane closure information/data may allow for an expected date and/or time for the identified and/or detected to lane closure to end and the affected lane(s) to be reopened.

Generally, planned lane closure information/data tends to not indicate which particular road segment or which lane will be affected. However, the planned closure information/data may be mapped to an identified and/or detected lane closure. For example, if a lane closure is detected along a road segment corresponding to First Avenue and it is known that a closure is planned for First Avenue, it may be determined that the identified and/or detected lane closure is likely a planned lane closure. However, if no lanes closures are planned for First Avenue it may be determined that the lane closure detected along the road segment corresponding to First Avenue is not a planned closure. For example, the closure may be due to a traffic incident (e.g., an accident), debris on the road, and/or the like.

In an example embodiment, first responder systems (e.g., police, firefighters, paramedics, and/or dispatch systems related thereto), may provide traffic incident information/data identifying traffic incidents and/or other incidents that may affect traffic (e.g., building fires, water main breaks, and/or the like). Similar to the planned lane closure information/data, traffic incident information/data may indicate a road name, a block number along a particular road, a nearby intersection, and/or the like. The identified and/or detected lane closure may be matched to traffic incident information/data based on the location of the road segment along which the detected lane closure was identified and the traffic incident information/data. If a detected lane closure corresponds and/or is matched to a recent incident, as indicated by the corresponding traffic incident information/data, the lane closure may be labeled as a traffic incident lane closure and/or an unplanned lane closure.

In an example embodiment, in response to determining that a detected lane closure is not a planned closure, the apparatus 10 may provide the computing entity 35 that corresponds to traffic management agency with an unplanned closure notification. Receipt and/or processing of the unplanned closure notification by the computing entity 35 may trigger an investigation of the detected lane closure through traffic cameras (e.g., manual and/or automated inspection of video and/or image data captured by one or more traffic cameras in the vicinity of the detected lane closure(s)), a team travelling to the site of the lane closure, and/or the like. Steps may then be taken to remedy the incident, remove the road debris, and/or the like that caused the unplanned lane closure. For example, possibly before first responders arrive at the scene of a traffic incident, a lane closure may be identified and/or detected and based on analyzing traffic camera information/data it may be determined that a traffic incident has occurred. Electronic signs in the vicinity of the road segment may be updated to provide a warning/alert regarding the traffic incident and/or probe apparatuses 20 aboard vehicles located on or in the vicinity of the road segment may be alerted to the traffic incident.

In some embodiments, the apparatus 10 may track the impact on traffic of identified lane closures. For example, identified lane closures may be analyzed to determine if a lane closure for a particular lane or during a particular time of the day or week appears to cause a disproportionate impact on travel along the road segment (e.g., greatly reduces travel speed, causes significant traffic jams, and/or the like). In an example embodiment, the apparatus 10 may provide information/data related to the impact of lane closures to a computing entity 35 corresponding to a traffic management agency. Such information/data may be used to plan future lane closures for construction and/or other plannable lane closures to mitigate the impact on traffic in the vicinity of the lane closure.

Embodiments of the present invention allow the use of probe information/data to identify and/or detect lane closures. In example embodiments, lane closures are identified and/or detected in real time or near real time. In particular, example embodiments allow for the determination of lane level traffic information/data, such as lane closures, based on GPS location data despite the GPS location data having a 95% confidence interval that is approximately twice the width of a lane.

Identifying Spatial Clusters

A non-limiting example technique of identifying determining, detecting, generating, and/or the like spatial clusters by analyzing the set of distance parameters {d}, in accordance with an example embodiment, will now be described with respect to FIGS. 5 and 6. FIG. 5 is a flowchart providing some processes and procedures for identifying, determining, detecting, generating, and/or the spatial clusters, according to an example embodiment. FIG. 6 provides example pseudo-code for identifying, determining, detecting, generating, and/or the spatial clusters, according to an example embodiment. Starting at block 202 of FIG. 5, a one dimensional array D of distance parameters d is generated. For example, the apparatus 10 may generate a one dimensional array D of distance parameters d. For example, apparatus 10 may comprise means, such as the processor 12 and/or the like, for generating a one dimensional array D of distance parameters d. In an example embodiment, the elements of the one dimensional array D comprise the elements of the set of distance parameters {d}. The one dimensional array D may comprise N elements, with each element corresponding to an instance of probe information/data. In an example embodiment, the one dimensional array D is an ordered array with the order based on increasing size of d. For example, $d_1$, the first element in the ordered one dimensional array D may be the smallest and/or most negative distance parameter d within the one dimensional array D and $d_{i+1} \geq d_i$ (for i=1, . . . , N−1) for each distance parameter. In another embodiment, the one dimensional array D is not an ordered array.

At block 204, the one dimensional array D may be converted, translated, mapped, and/or the like to a positive array V. In an example embodiment, each element v of the positive array V is non-negative. In example embodiments, the positive array V may also be one dimensional. In an example embodiment, the positive array V maintains the ordering of the elements of the one dimensional array D. For example, the apparatus 10 may convert, translate, map, and/or the like the one dimensional array D to a positive array V. In an example embodiment, the apparatus 10 may comprise means, such as processor 12 and/or the like, for converting, translating, mapping and/or the like the one dimensional array D to a positive array V. For example, in an example embodiment, the one dimensional array D may be converted, translated, mapped to a positive array V using the mapping $v_i = d_i + |\min(D)|$, such that an element v of the positive array V is the corresponding distance parameter plus the absolute value of the least (i.e., smallest or most negative element) of the one dimensional array D. For example, min (D)$\leq d_i$ for i=1, . . . , N. In various embodiments, various mappings may be used to convert, translate, map, and/or the like the one dimensional array D to the positive array V.

At block 206, the positive array V may be filtered to remove outliers. For example, the apparatus 10 may filter the positive array V to remove outliers. For example, the apparatus 10 may comprise means, such as the processor 12 and/or the like, for filtering the positive array V to remove outliers. In an example embodiment, as shown by example pseudocode section 306, the mean value and standard deviation of the elements v of the positive array V may be determined. In an example embodiment, the elements v having values that are more than two standard deviations from the mean value of the positive array V may be pruned, removed, filtered out, and/or the like from the positive array V. As should be understood, outliers may be filtered and/or pruned from the positive array V using various techniques in various embodiments.

At block 208 of FIG. 5, the elements v of the positive array V may be segmented into buckets b. In an example embodiment, the elements v of the positive array V may be segmented into K buckets b (e.g., $b_1, \ldots, b_K$). For example, the apparatus 10 may segment the positive array V into buckets b. For example, the apparatus 10 may comprise means, such as the processor 12 and/or the like, for segmenting the positive array V into buckets b. For example, as shown by example pseudocode section 308, the range r of the elements v of the positive array V may be determined and the elements of v may then be segmented into buckets having a range r/K. In an example embodiment, if 0 is the smallest element of V and 10 is the largest element of V, the range of the elements v in the positive array V is 11. In the illustrated example embodiment, K=16; however, other values of K may be used in other embodiments. For example, the first bucket $b_1$ may be defined as $b_1=\{v \text{ in } V | v<\max(V) \text{ and } v>\max(V)-r\}$. In an example embodiment, the second bucket $b_2$ may be defined as $b_2=\{v \text{ in } V | v<\max(V)-r \text{ and } v>\max(V)-2r\}$. In another example embodiment, the elements of $b_1$ are removed from V before the second bucket $b_2$ is defined and the second bucket $b_2$ is defined as $b_1=\{v \text{ in } (V-b_1) | v<\max(V-b_1) \text{ and } v>\max(V-b_1)-r\}$. Thus, the elements v of the positive array V may be segmented and/or distributed into K buckets, wherein the $i^{th}$ bucket $b_i$ comprises the elements v of the positive array V having values in the range defined by $[\max(V)-(i-1)*r]$ and $[\max(V)-i*r]$. As should be understood, in various embodiments, the elements v of the positive array V may be segmented using various techniques.

Continuing to block 210 of FIG. 5, it is determined if a pair of adjacent buckets are spatially distinct. For example, the apparatus 10 may determine if a pair of adjacent buckets are spatially distinct. For example, the apparatus 10 may comprise means, such as the processor 12 and/or the like, for determining if a pair of adjacent buckets are spatially distinct. For example, the mean value of bucket $b_1$ may be compared to the mean value of adjacent bucket $b_2$ to determine if the pair of adjacent buckets $b_1$ and $b_2$ are spatially distinct. For example, as shown by example pseudocode block 310 in FIG. 6, the value MG may be calculated to determine if two adjacent buckets are spatially distinct. In the example embodiment shown in FIG. 6, the value MG is equal to the difference between the mean of the values of bucket $b_1$ and the mean values of bucket $b_i$ divided by the range of the positive array V, wherein at the time of calculation, the positive array V only comprises elements that were not assigned to buckets that have already been assigned to a cluster. If the number of elements in the bucket $b_1$ (e.g., $|b_1|$) is greater than a first parameter P1 (e.g., 8 and/or the like), the value of MG is greater than a second parameter P2 (e.g., 0.3 and/or the like), and the number of elements in an array defined by removing the elements of bucket $b_1$ from the positive array V (e.g., $|V-b_1|$) is greater than a third parameter P3 (e.g., 8 and/or the like), then the bucket $b_1$ and the bucket $b_i$ are spatially distinct. If at least one of $|b_1|$ is not greater than the first parameter P1, MG is not greater than the second parameter P2, and/or $|V-b_1|$ is not greater than the third parameter P3, it is determined that the bucket $b_1$ and the bucket $b_i$ are not spatially distinct. As should be understood, various analysis of pairs of adjacent buckets may be used to determine if the buckets represent spatially distinct elements v, wherein each element v has a translated distance parameter d.

At block 212 of FIG. 5, if it is determined that the pair of adjacent buckets are not spatially distinct, the pair of buckets may be combined into a single bucket. For example, responsive to determining that buckets $b_1$ and $b_i$ are not spatially distinct, the elements v of bucket $b_i$ may be added to bucket $b_1$. For example, the apparatus 10 may, responsive to determining that a pair of adjacent buckets are not spatially distinct, combine the pair of buckets into a single bucket. For example, the apparatus 10 may comprise means, such as processor 12 and/or the like, for, responsive to determining that a pair of buckets are not spatially distinct, combining the pair of buckets into a single bucket. For example, as shown by example pseudocode block 312 of FIG. 6, the bucket $b_1$ may be redefined to comprise the elements v of bucket $b_1$ and bucket $b_i$. The process then returns to block 210 to determine if the new bucket $b_1$ is spatially distinct from the next adjacent bucket. For example, if buckets $b_1$ and $b_2$ were determined to not be spatially distinct and were then combined into bucket $b_1$ the process may then return to block 210 to determine if bucket $b_1$ is spatially distinct from adjacent bucket $b_3$. If no next adjacent bucket exists, the process may proceed as if the bucket $b_1$ is spatially distinct from the next adjacent bucket.

If, at block 210 of FIG. 5, it is determined that the pair of adjacent buckets are spatially distinct, then the process continues to block 214. At block 214, a cluster is defined based on the elements of the current first bucket $b_1$. For example, the apparatus 10 may define a cluster based on the elements of the current first bucket $b_1$. For example, the apparatus 10 may comprise means, such as the processor 12 and/or the like, for defining a cluster based on the elements of the current first bucket $b_1$. In an example embodiment, defining the cluster may comprise defining cluster information/data. In an example embodiment, the cluster information/data may comprise a vector MD comprising a cluster identifier C, the average (e.g., mean, median, or mode) of the elements v of the current first bucket $b_1$, the standard deviation of the elements v of the current first bucket $b_1$, and the value MG. In various embodiments, the cluster may be defined in a variety of ways, as appropriate for the application. Example pseudocode block 314 of FIG. 6 provides an example technique for defining a cluster based on the elements of the current first bucket $b_1$, according to an example embodiment. Various cluster information/data may be determined and/or defined in various embodiments, as appropriate for the application.

After defining the cluster based on the elements of the current first bucket $b_1$, and/or responsive thereto, the process may continue to block 218 of FIG. 5 to determine if all of the buckets have been processed (e.g., assigned to a cluster). For example, the apparatus 10 may determine if all of the buckets have been processed. For example, the apparatus 10 may comprise means, such as the processor 12, for determining if all of the buckets have been processed. If all of the buckets have not been processed, the process returns to block 210 to determine if the next pair of adjacent buckets are spatially distinct. If all of the buckets have been processed, the process continues to block 216. At block 216, the cluster information/data may be provided. For example, the apparatus 10 may provide the cluster information/data. For example, the apparatus 10 may comprise means, such as the processor 12 and/or the like, for providing the cluster information/data. For example, the set of clusters and the corresponding cluster information/data for each cluster may be provided. Example pseudocode block 316 of FIG. 6 shows an example technique for providing the set of clusters and/or the corresponding cluster information/data, according to an example embodiment. For example, the cluster information/data may be provided for storage as historical cluster information/data, for determining the current number of clusters, determining a historical number of clusters, and/or the like.

Figure 7A:
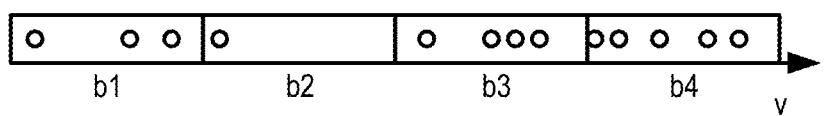
Figure 7B:
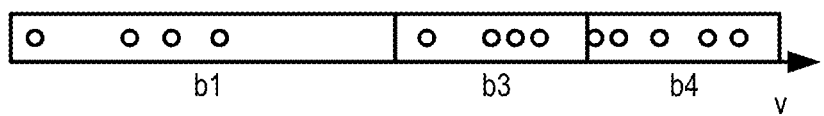
Figure 7C:
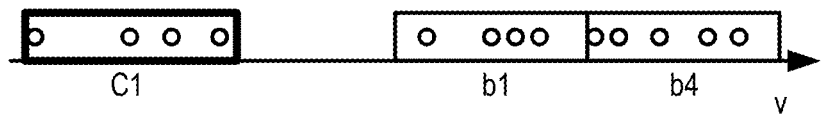
Figure 7D:
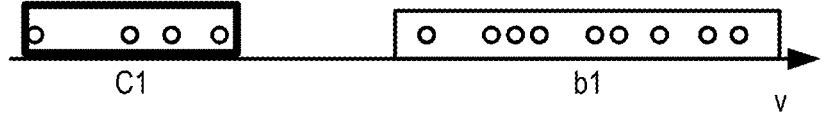
Figure 7E:
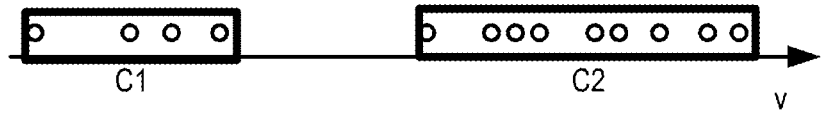

FIGS. 7A-7E provide a schematic of the processes indicated by blocks 208-214 of FIG. 5. In particular, in FIG. 7A, the elements v of the positive array V are segmented by defining buckets $b_1$, $b_2$, $b_3$, and $b_4$, corresponding to block 208 and example pseudocode block 308. In FIG. 7B, it has been determined that adjacent buckets $b_1$ and $b_2$ are not spatially distinct and the elements v of bucket $b_2$ have been added to bucket $b_1$, corresponding to blocks 210 and 212 and example pseudocode blocks 310 and 312. In FIG. 7C, it has been determined that bucket $b_1$ is spatially distinct from bucket $b_3$ and cluster $C_1$ has been defined based on the elements v of bucket $b_1$, corresponding to blocks 210 and 214 and example pseudocode blocks 310 and 314. The bucket $b_3$ then becomes bucket $b_1$. In FIG. 7D, it has been determined that bucket $b_1$ and bucket $b_4$ are not spatially distinct and the elements v of bucket $b_4$ have been added to bucket $b_1$, corresponding to blocks 210 and 212 and example pseudocode blocks 310 and 312. In FIG. 7E, it has been determined that there are no remaining buckets that are adjacent to bucket $b_1$. In particular, there are no buckets remaining that have not been clustered. Thus, cluster $C_2$ is defined based on the elements v of bucket $b_1$, corresponding to blocks 210 and 214 and example pseudocode blocks 310 and 314. The clusters $C_1$ and $C_2$ and the corresponding cluster information/data are then provided, returned, and/or the like. For example, clusters $C_1$ and $C_2$ and the corresponding cluster information/data may be provided such that the current number of clusters may be determined, the clusters $C_1$ and $C_2$ and the corresponding cluster information/data may be stored as historical cluster information/data, and/or the like (e.g., for future use in determining a historical number of clusters).

III. Example Apparatus

The probe apparatus 20, computing entity 35, and/or apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the probe apparatus 20, computing entity 35, and/or apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. In this regard, FIG. 2A depicts an apparatus 10 and FIG. 2B depicts a probe apparatus 20 of an example embodiment that may be embodied by various computing devices including those identified above. As shown, the apparatus 10 of an example embodiment may include, may be associated with or may otherwise be in communication with a processor 12 and a memory device 14 and optionally a communication interface 16 and/or a user interface 18. Similarly, a probe apparatus 20 of an example embodiment may include, may be associated with, or may otherwise be in communication with a processor 22, and a memory device 24, and optionally a communication interface 26, a user interface 28, one or more sensors 30 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In example embodiments, a computing entity 35 may, similar to the apparatus 10 and/or probe apparatus 20, comprise a processor, memory device, communication interface, user interface, and/or one or more additional components configured to perform various operations, procedures, functions, or the like described herein. In an example embodiment, a computing entity may comprise one or more sensors similar to the one or more sensors 30.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 10, computing entity 35, and/or probe apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 10, computing entity 35, and/or probe apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The apparatus 10, computing entity 35, and/or the probe apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the apparatus 10, computing entity 35, and/or probe apparatus 20 of an example embodiment, a navigation system may also include or have access to a geographic database that includes a variety of data (e.g., map information/data) utilized in constructing a route or navigation path, determining the time to traverse the route or navigation path, matching a geolocation (e.g., a GNSS determined location) to a point on a map and/or link, and/or the like. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records (e.g., node data records, link data records, POI data records, and/or other data records) may comprise computer-executable instructions, a reference to a function repository that comprises computer-executable instructions, one or more coefficients and/or parameters to be used in accordance with an algorithm for performing the analysis, one or more response criteria for providing a response indicating a result of the analysis, and/or the like. In at least some example embodiments, the probe apparatus 20 and/or computing entity 35 may be configured to execute computer-executable instructions provided by and/or referred to by a data record. In an example embodiment, the apparatus 10 may be configured to modify, update, and/or the like one or more data records of the geographic database.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be updated based on information/data provided by one or more probe apparatuses.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10, computing entity 35, and/or probe apparatus 20 in accordance with an example embodiment may determine the time to traverse a route that includes one or more turns at respective intersections more accurately.

IV. Apparatus, Methods, and Computer Program Products

As described above, FIGS. 3 and 5 illustrate flowcharts of apparatuses 10, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:

receiving a plurality of instances of probe data, each instance being from a probe apparatus of a plurality of probe apparatuses, the probe apparatus comprising a plurality of sensors and being onboard a vehicle, wherein an instance of the plurality of instances of probe data comprises location information indicating a location of the corresponding probe apparatus;

for each of one or more instances of the plurality of instances of probe data, determining a distance parameter based on the location information and a road segment corresponding to the location;

defining a set of distance parameters based on the distance parameter determined for each of the one or more instances of the plurality of instances of probe data;

analyzing the set of distance parameters to identify clusters of probe data, wherein identifying the clusters of probe data comprises:

segmenting the probe data by segmenting the set of distance parameters into a plurality of ranges based on the values of the distance parameters, determining whether a range of the plurality of ranges is spatially distinct from an adjacent range, responsive to determining that the range is spatially distinct from the adjacent range, identifying the probe data corresponding to distance parameters in the range as a cluster, and responsive to determining that the range is not spatially distinct from the adjacent range, combining the range and the adjacent range;

determining the number of clusters identified;

comparing the number of clusters identified to a historical number of clusters; and responsive to determining that the number of clusters identified satisfies a threshold based upon the historical number of clusters, determining that there is a lane closure corresponding to the road segment.

2. A method according to claim 1, wherein the location information is determined by a global navigation satellite system (GNSS) sensor onboard the vehicle.

3. A method according to claim 1, the distance parameter is determined by:

identifying a position on a link of a digital map corresponding to the road segment based on the location information;

determining a distance between the position and the location; and assigning the distance parameter the value of the determined distance.

4. A method according to claim 3, wherein the position is located on a reference line corresponding to the road segment and the distance is equal to the length of a line extending from the position to the location, wherein the line is perpendicular to the reference line.

5. A method according to claim 4, wherein the reference line corresponds to the middle of the road segment.

6. A method according to claim 1, wherein the plurality of instances of probe data are received within a configurable time period.

7. A method according to claim 6, wherein the configurable time period is within the range one minute to eighty minutes.

8. A method according to claim 1, wherein in response to determining that a lane closure event is occurring, providing a closure notification to a computing entity, wherein, when the closure notification is processed by the computing entity, the closure notification causes the computing entity to (a) perform one or more route planning determinations, (b) provide a closure alert, or (c) both.

9. A method according to claim 1, wherein the analyzing the set of distance parameters to identify clusters of probe data comprises:

generating a one dimensional array from the set of distance parameters;

converting the one dimensional array to a positive array;

segmenting the elements of the positive array into a set of buckets;

determining if pairs of adjacent buckets of the set of buckets are spatially distinct;

responsive to determining that a pair of adjacent buckets are not spatially distinct, combining the pair of adjacent buckets into one bucket; and responsive to determining that a pair of adjacent buckets are spatially distinct, defining a cluster based on at least one of the buckets of the pair of adjacent buckets.

10. An apparatus comprising at least one processor, and at least one memory storing computer program code, with the at least one memory and the computer program code configured to, with the processor, cause the apparatus to at least:

receive a plurality of instances of probe data, each instance being from a probe apparatus of a plurality of probe apparatuses, the probe apparatus comprising a plurality of sensors and being onboard a vehicle, wherein an instance of the plurality of instances of probe data comprises location information indicating a location of the corresponding probe apparatus;

for each of one or more instances of the plurality of instances of probe data, determine a distance parameter based on the location information and a road segment corresponding to the location;

define a set of distance parameters based on the distance parameter determined for each of the one or more instances of the plurality of instances of probe data;

analyze the set of distance parameters to identify clusters of probe data, wherein identifying the clusters of probe data comprises:

segmenting the probe data by segmenting the set of distance parameters into a plurality of ranges based on the values of the distance parameters, determining whether a range of the plurality of ranges is spatially distinct from an adjacent range, responsive to determining that the range is spatially distinct from the adjacent range, identifying the probe data corresponding to distance parameters in the range as a cluster, and responsive to determining that the range is not spatially distinct from the adjacent range, combining the range and the adjacent range;

determine the number of clusters identified;

compare the number of clusters identified to a historical number of clusters; and responsive to determining that the number of clusters identified satisfies a threshold based upon the historical number of clusters, determine that there is a lane closure corresponding to the road segment.

11. An apparatus according to claim 10, wherein the location information is determined by a global navigation satellite system (GNSS) sensor onboard the vehicle.

12. An apparatus according to claim 10, wherein to determine the distance parameter the at least one memory and the computer program code configured to, with the processor, cause the apparatus to at least:

identify a position on a link of a digital map corresponding to the road segment based on the location information;

determine a distance between the position and the location; and assign the distance parameter the value of the determined distance.

13. An apparatus according to claim 12, wherein the position is located on a reference line corresponding to the road segment and the distance is equal to the length of a line extending from the position to the location, wherein the line is perpendicular to the reference line.

14. An apparatus according to claim 13, wherein the reference line corresponds to the middle of the road segment.

15. An apparatus according to claim 10, wherein the plurality of instances of probe data are received within a configurable time period.

16. An apparatus according to claim 15, wherein the configurable time period is within the range one minute to eighty minutes.

17. An apparatus according to claim 10, wherein in response to determining that a lane closure event is occurring the at least one memory and the computer program code configured to, with the processor, cause the apparatus to at least provide a closure notification to a computing entity, wherein, when the closure notification is processed by the computing entity, the closure notification causes the computing entity to (a) perform one or more route planning determinations, (b) provide a closure alert, or (c) both.

18. An apparatus according to claim 10, wherein to analyze the set of distance parameters to identify clusters of probe data the at least one memory and the computer program code configured to, with the processor, cause the apparatus to at least:
  generate a one dimensional array from the set of distance parameters;
  convert the one dimensional array to a positive array;
  segment the elements of the positive array into a set of buckets;
  determine if pairs of adjacent buckets of the set of buckets are spatially distinct;
  responsive to determining that a pair of adjacent buckets are not spatially distinct, combine the pair of adjacent buckets into one bucket; and
  responsive to determining that a pair of adjacent buckets are spatially distinct, define a cluster based on at least one of the buckets of the pair of adjacent buckets.

19. A computer program product comprising at least one non-transitory computer-readable storage medium having computer-executable program code instructions stored therein with the computer-executable program code instructions comprising program code instructions configured to:
  receive a plurality of instances of probe data, each instance being from a probe apparatus of a plurality of probe apparatuses, the probe apparatus comprising a plurality of sensors and being onboard a vehicle, wherein an instance of the plurality of instances of probe data comprises location information indicating a location of the corresponding probe apparatus;
  for each of one or more instances of the plurality of instances of probe data, determine a distance parameter based on the location information and a road segment corresponding to the location;
  define a set of distance parameters based on the distance parameter determined for each of the one or more instances of the plurality of instances of probe data;
  analyze the set of distance parameters to identify clusters of probe data, wherein identifying the clusters of probe data comprises:
    segmenting the probe data by segmenting the set of distance parameters into a plurality of ranges based on the values of the distance parameters,
    determining whether a range of the plurality of ranges is spatially distinct from an adjacent range,
    responsive to determining that the range is spatially distinct from the adjacent range, identifying the probe data corresponding to distance parameters in the range as a cluster, and
    responsive to determining that the range is not spatially distinct from the adjacent range, combining the range and the adjacent range;
  determine the number of clusters identified;
  compare the number of clusters identified to a historical number of clusters; and
  responsive to determining that the number of clusters identified satisfies a threshold based upon the historical number of clusters, determine that there is a lane closure corresponding to the road segment.

20. A computer program product according to claim 19, wherein in response to determining that a lane closure event is occurring the at least one memory and the computer program code configured to, with the processor, cause the apparatus to at least provide a closure notification to a computing entity, wherein, when the closure notification is processed by the computing entity, the closure notification causes the computing entity to (a) perform one or more route planning determinations, (b) provide a closure alert, or (c) both.

* * * * *